(12) United States Patent
Smith et al.

(10) Patent No.: US 10,558,591 B2
(45) Date of Patent: Feb. 11, 2020

(54) METHOD AND APPARATUS FOR IN-BAND PRIORITY ADJUSTMENT FORWARDING IN A COMMUNICATION FABRIC

(71) Applicant: Advanced Micro Devices, Inc., Sunnyvale, CA (US)

(72) Inventors: Alan Dodson Smith, Austin, TX (US); Eric Christopher Morton, Austin, TX (US); Vydhyanathan Kalyanasundharam, San Jose, CA (US); Joe G. Cruz, North Grafton, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 40 days.

(21) Appl. No.: 15/728,191

(22) Filed: Oct. 9, 2017

(65) Prior Publication Data

US 2019/0108143 A1 Apr. 11, 2019

(51) Int. Cl.
*G06F 13/16* (2006.01)
*G06F 13/364* (2006.01)
(Continued)

(52) U.S. Cl.
CPC ...... *G06F 13/1621* (2013.01); *G06F 13/1673* (2013.01); *G06F 13/364* (2013.01); *G06F 13/4022* (2013.01); *G06F 13/4265* (2013.01)

(58) Field of Classification Search
CPC . G06F 13/1621; G06F 13/1673; G06F 13/364
See application file for complete search history.

(56) References Cited

U.S. PATENT DOCUMENTS 4,760,515 A * 7/1988 Malmquist ............. G06F 13/14
 710/121
5,553,223 A 9/1996 Greenlee et al.
(Continued)

FOREIGN PATENT DOCUMENTS

WO 96/38791 A1 12/1996
WO 00/31925 A1 6/2000

OTHER PUBLICATIONS

Tsien et al., U.S. Appl. No. 15/725,912, entitled "Dynamic Control of Multi-Region Fabric", filed Oct. 5, 2017, 29 pages.
(Continued)

*Primary Examiner* — Jael M Ulysse
(74) *Attorney, Agent, or Firm* — Meyertons Hood Kivlin Kowert and Goetzel PC; Rory D. Rankin (57) ABSTRACT

Systems, apparatuses, and methods for implementing priority adjustment forwarding are disclosed. A system includes at least one or more processing units, a memory, and a communication fabric coupled to the processing unit(s) and the memory. The communication fabric includes a plurality of arbitration points. When a client determines that its bandwidth requirements are not being met, the client generates and sends an in-band priority adjustment request to the nearest arbitration point. This arbitration point receives the in-band priority adjustment request and then identifies any pending requests which are buffered at the arbitration point which meet the criteria specified by the in-band priority adjustment request. The arbitration point adjusts the priority of any identified requests, and then the arbitration point forwards the in-band priority adjustment request on the fabric to the next upstream arbitration point which processes the in-band priority adjustment request in the same manner.

23 Claims, 8 Drawing Sheets

(51) Int. Cl.
  *G06F 13/42* (2006.01)
  *G06F 13/40* (2006.01)

(56) References Cited

U.S. PATENT DOCUMENTS

| | | | |
|---|---|---|---|
| 5,706,502 A | 1/1998 | Foley et al. | |
| 5,761,513 A | 6/1998 | Yellin et al. | |
| 5,815,653 A | 9/1998 | You et al. | |
| 5,923,885 A | 7/1999 | Johnson et al. | |
| 6,058,393 A | 5/2000 | Merier et al. | |
| 6,119,247 A | 9/2000 | House et al. | |
| 6,138,140 A | 10/2000 | Yokote | |
| 6,618,854 B1 | 9/2003 | Mann | |
| 7,596,647 B1* | 9/2009 | Van Dyke | G06F 13/364 |
| | | | 710/116 |
| 8,448,001 B1 | 5/2013 | Zhu et al. | |
| 9,529,400 B1 | 12/2016 | Kumar et al. | |
| 9,594,621 B1 | 3/2017 | Navilappa | |
| 9,886,414 B2 | 2/2018 | Yun et al. | |
| 9,971,700 B2 | 5/2018 | Loh | |
| 9,983,652 B2 | 5/2018 | Piga et al. | |
| 10,067,796 B1* | 9/2018 | Metcalf | G06F 12/10 |
| 2003/0035371 A1* | 2/2003 | Reed | H04L 47/12 |
| | | | 370/230 |
| 2003/0172149 A1* | 9/2003 | Edsall | G06F 3/0605 |
| | | | 709/224 |
| 2003/0191857 A1* | 10/2003 | Terrell | H04L 45/00 |
| | | | 709/244 |
| 2004/0093404 A1 | 5/2004 | Snyder et al. | |
| 2005/0198459 A1* | 9/2005 | Bogin | G06F 5/06 |
| | | | 711/167 |
| 2005/0228531 A1 | 10/2005 | Genovker et al. | |
| 2006/0109829 A1* | 5/2006 | O'Neill | H04L 12/185 |
| | | | 370/338 |
| 2006/0165115 A1 | 7/2006 | Warren et al. | |
| 2006/0171329 A1 | 8/2006 | Ying | |
| 2008/0120441 A1* | 5/2008 | Loewenstein | G06F 12/0815 |
| | | | 710/22 |
| 2008/0126750 A1 | 5/2008 | Sistla et al. | |
| 2009/0016355 A1 | 1/2009 | Moyes | |
| 2009/0168782 A1* | 7/2009 | Beshai | H04L 47/60 |
| | | | 370/395.4 |
| 2010/0211720 A1* | 8/2010 | Satpathy | G11C 7/10 |
| | | | 710/317 |
| 2011/0035529 A1 | 2/2011 | Wang et al. | |
| 2011/0119526 A1 | 5/2011 | Blumrich et al. | |
| 2011/0138098 A1* | 6/2011 | Satpathy | G11C 7/10 |
| | | | 710/317 |
| 2011/0219208 A1* | 9/2011 | Asaad | G06F 15/76 |
| | | | 712/12 |
| 2012/0059962 A1* | 3/2012 | Lai | G06F 13/3625 |
| | | | 710/113 |
| 2012/0072563 A1 | 3/2012 | Johnsen et al. | |
| 2012/0221767 A1* | 8/2012 | Post | G06F 13/1673 |
| | | | 711/103 |
| 2014/0192583 A1 | 7/2014 | Rajan et al. | |
| 2014/0201471 A1* | 7/2014 | Cutter | G06F 13/1663 |
| | | | 711/151 |
| 2014/0281083 A1* | 9/2014 | Canepa | G06F 13/364 |
| | | | 710/112 |
| 2015/0120978 A1 | 4/2015 | Kalyanasundharam et al. | |
| 2015/0220460 A1* | 8/2015 | Litch | G06F 13/30 |
| | | | 710/114 |
| 2015/0269396 A1 | 9/2015 | Grafton | |
| 2016/0094435 A1 | 3/2016 | Goss et al. | |
| 2016/0127191 A1 | 5/2016 | Nair | |
| 2016/0191420 A1* | 6/2016 | Nagarajan | H04L 45/7453 |
| | | | 370/389 |
| 2016/0210381 A1* | 7/2016 | Singleton | G06F 17/5009 |
| 2016/0378168 A1 | 12/2016 | Branover et al. | |
| 2017/0339106 A1 | 11/2017 | Rimmer et al. | |
| 2018/0048562 A1 | 2/2018 | Meyer | |
| 2018/0063016 A1* | 3/2018 | Gulati | H04L 49/109 |
| 2018/0067775 A1* | 3/2018 | Frandzel | G06F 3/0611 |
| 2019/0199617 A1 | 6/2019 | Kalyanasundharam et al. | |

OTHER PUBLICATIONS

Non-Final Office Action in U.S. Appl. No. 15/725,912, dated Jul. 12, 2018, 10 pages.
International Search Report and Written Opinion in International Application No. PCT/US2018/051542, dated Dec. 12, 2018, 12 pages.
Final Office Action in U.S. Appl. No. 15/725,912, dated Feb. 7, 2019, 15 pages.
International Search Report and Written Opinion in International Application No. PCT/US2018/051782, dated Jan. 4, 2019, 14 pages.
Non-Final Office Action in U.S. Appl. No. 15/850,616, dated Mar. 14, 2019, 12 pages.
Final Office Action in U.S. Appl. No. 15/850,616, dated Jul. 23, 2019, 14 pages.

\* cited by examiner

| Priority Table 400 | Priority Type | Low | Medium | High | Urgent |
|---|---|---|---|---|---|
| | Priority Encoding | 00 | 01 | 10 | 11 |

Arbitration Point 610A

Request Buffer 620A

| Source ID | Destination ID | Virtual Channel | Priority |
|---|---|---|---|
| 205A | 240 | 315 | Medium |
| 205B | 240 | 320 | Medium |
| 205C | 240 | 325 | High |
| 205A | 240 | 315 | Medium |
| 215A | 240 | 330 | Low |
| 215B | 225C | 335 | Low |
| 205A | 240 | 315 | Medium |
| 230B | 240 | 340 | High |
| ... | ... | ... | ... |

In-Band Request 600

| Master ID 205A | VC ID 315 | Encoding 615 | Adjust to High Priority |
|---|---|---|---|

METHOD AND APPARATUS FOR IN-BAND PRIORITY ADJUSTMENT FORWARDING IN A COMMUNICATION FABRIC

BACKGROUND

Description of the Related Art

Computing systems are increasingly integrating large numbers of different types of components on a single chip or on multi-chip modules. The complexity and power consumption of a system increases with the number of different types of components. Often, these components are connected together via switches, routers, communication buses, bridges, buffers, controllers, coherent devices, and other links. The combination of these interconnecting components is referred to herein as a "communication fabric", or "fabric" for short. Generally speaking, the fabric facilitates communication by routing messages between a plurality of components on an integrated circuit (i.e., chip) or multi-chip module. Examples of messages communicated over a fabric include memory access requests, status updates, data transfers, coherency probes, coherency probe responses, and the like. Certain clients of the fabric can fall behind when their bandwidth requirements are not being met by the fabric and/or memory subsystem. Determining how to help these clients catch up, without creating new problems (i.e., processing requests out of order), can be challenging.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing priority adjustment forwarding are disclosed herein. In one embodiment, a system includes at least one or more processing units, a communication fabric, and one or more memory devices. In one embodiment, the system implements priority adjustment forwarding in a non-flow-control way to adjust the priority of requests. In one embodiment, when a client (e.g., a processing unit) wants to change the priority of its outstanding requests, the client sends a priority escalation request to the nearest arbitration point on the path to the memory controller. It is noted that the client is located outside of the fabric, and the client sends a request, which can be in-band or on a separate wire, to a master in the fabric, with the master conveying an in-band request to the nearest arbitration point. Generally speaking, sending a request "in-band" refers to sending the request via the same communication channel as ordinary packets (e.g., read requests, write requests, write data, read response data), rather than a separate channel.

In response to receiving the priority escalation request, the nearest arbitration point increases the priority of all the client's pending requests buffered at the arbitration point prior to sending any currently pending requests out on the fabric. Then, this arbitration point sends the in-band request out on every path to the memory controller. In other embodiments, a particular path can be identifiable based on the client or virtual channel associated with a request. In such embodiments, the in-band request is forwarded on only the identified path rather than every path. Each subsequent arbitration point performs the same functions as the first arbitration point upon receiving the in-band request, causing the in-band request to move forward on the path(s) to the memory controller. When the client sends out a new request with the adjusted priority, all of the previous outstanding requests for the client, at various arbitration points in the fabric, will have had their priority elevated or will be in the process of having their priority adjusted, ensuring that the correct ordering of requests for the client will be maintained by the fabric.

Figure 1:
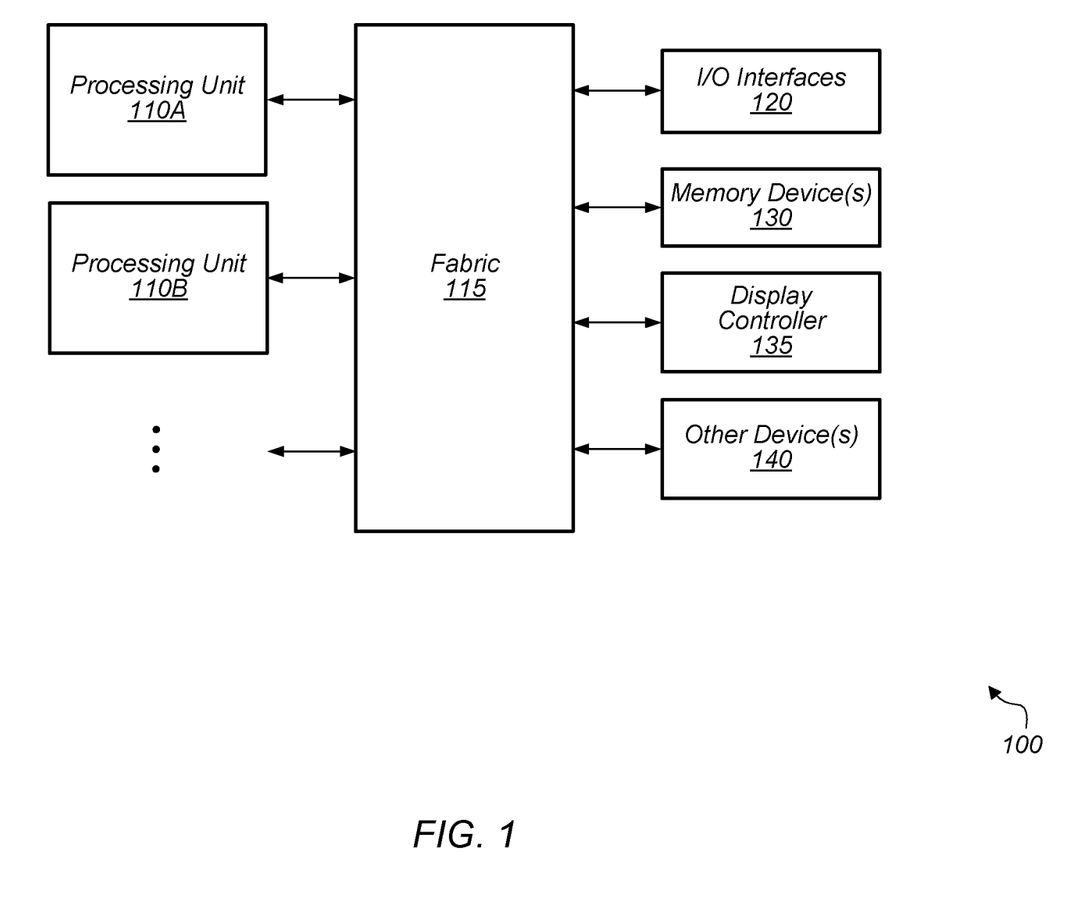
FIG. 1 is a block diagram of one embodiment of a computing system.

Referring now to FIG. 1, a block diagram of one embodiment of a computing system 100 is shown. In one embodiment, computing system 100 includes at least processing units 110A-B, fabric 115, input/output (I/O) interfaces 120, memory device(s) 130, display controller 135, and other device(s) 140. In other embodiments, computing system 100 can include other components and/or computing system 100 can be arranged differently. Processing units 110A-B are representative of any number and type of processing units. For example, in one embodiment, processing unit 110A is a central processing unit (CPU) and processing unit 110B is a graphics processing unit (GPU). In other embodiments, processing units 110A-B can include other numbers and types of processing units (e.g., digital signal processor (DSP), field programmable gate array (FPGA), application specific integrated circuit (ASIC)).

Fabric 115 is representative of any communication interconnect and any protocol for communicating among the components of the system 100. Fabric 115 provides the data paths, switches, routers, multiplexers, controllers, and other logic that connect the processing units 110A-B, I/O interfaces 120, memory device(s) 130, and other device(s) 140 to each other. Fabric 115 handles the request, response, and data traffic, as well as probe traffic to facilitate coherency. Fabric 115 also handles interrupt request routing and configuration access paths to the various components of system 100. Fabric 115 can be bus-based, including shared bus configurations, cross bar configurations, and hierarchical buses with bridges. Fabric 115 can also be packet-based, and can be hierarchical with bridges, cross bar, point-to-point, or other interconnects. From the point of view of fabric 115, the other components of system 100 can be referred to as "clients". Fabric 115 is configured to process requests generated by various clients and pass the requests on to other clients.

In one embodiment, fabric 115 includes a plurality of arbitration points and a plurality of masters, with each master abstracting one or more clients and generating or proxying requests into the fabric for the clients. The arbitration points can also be referred to as crossbars, switches, or routers. When one of the clients of fabric 115 is not having its bandwidth requirements met, the client can generate an escalation request to escalate (i.e., increase) the priority of its outstanding requests. Alternatively, if the client's needs are being met, the client can generate a reduction request to decrease the priority of its outstanding requests. In either case, the client sends the in-band adjustment request via a master to the nearest arbitration point(s) of fabric 115 on the path to memory device(s) 130. Each arbitration point temporarily prevents any requests from being forwarded out of the arbitration point in response to receiving an in-band adjustment request from the master. Then, the arbitration point identifies any requests of the client which are buffered at the arbitration point. The arbitration point adjusts the priority of these requests to the priority specified by the in-band adjustment request. Next, the arbitration point forwards the in-band adjustment request on all paths to memory device(s) 130 and starts allowing requests to be forwarded out of the arbitration point. As the in-band adjustment request makes its way from the client to memory device(s) 130, the in-band adjustment request can be described as traveling "upstream" through fabric 115. Each subsequent arbitration point processes the in-band adjustment request in the same manner as this first arbitration point.

Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by processing units 110A-B, I/O interfaces 120, display controller 135, and other device(s) 140 via fabric 115. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth. Other device(s) 140 are representative of any number and type of devices (e.g., multimedia device, video codec).

In various embodiments, computing system 100 can be a computer, laptop, mobile device, server or any of various other types of computing systems or devices. It is noted that the number of components of computing system 100 can vary from embodiment to embodiment. There can be more or fewer of each component than the number shown in FIG. 1. It is also noted that computing system 100 can include other components not shown in FIG. 1. Additionally, in other embodiments, computing system 100 can be structured in other ways than shown in FIG. 1.

Figure 2:
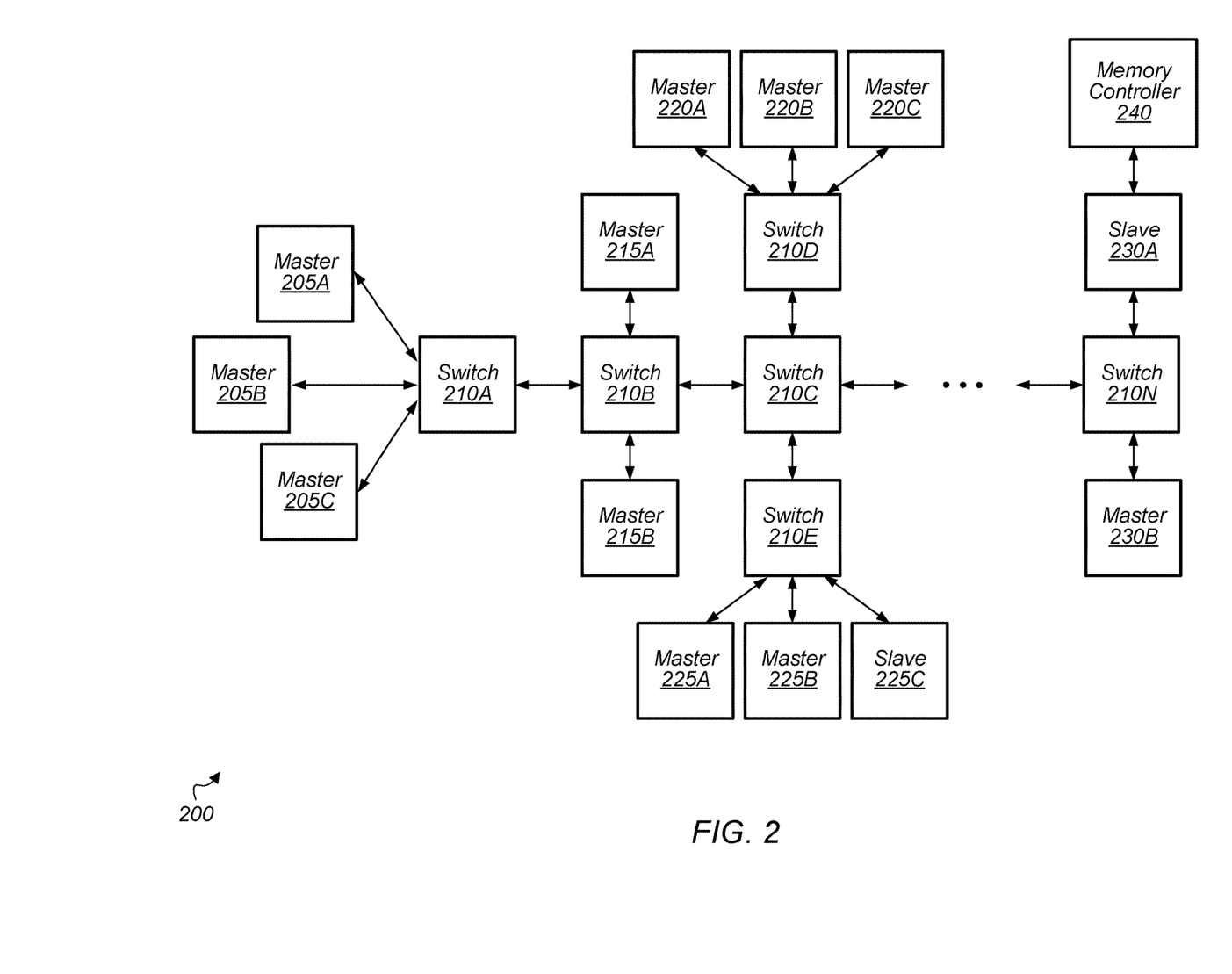
FIG. 2 is a block diagram of one embodiment of switch connections in a communication fabric of a computing system.

Turning now to FIG. 2, a block diagram of one embodiment of switch connections in a communication fabric of a computing system 200 is shown. The fabric includes a plurality of switches 210A-N, which are coupled to each other and to various masters and slaves throughout system 200. The number and topology of switches 210A-N can vary from embodiment to embodiment. Each switch 210A-N can also be referred to as an arbitration point, crossbar, or router. Each master connected to a switch 210A-N abstracts one or more clients to the fabric and generates or proxies requests into the fabric for these clients. Depending on the embodiment, a client can be a processing unit (e.g., CPU, GPU), a display controller, an interrupt unit, a video codec, an I/O device, an I/O interface, a cache, a cache controller, coherence manager, or other types of components.

As shown in FIG. 2, masters 205A-C are coupled to switch 210A, with masters 205A-C representative of any number and type of masters. Similarly, the other masters shown connected to the various switches 210B-N of fabric 200 are also representative of any number and type of masters. Each master can also be referred to as a source or a requester on the fabric. Accordingly, it should be understood that while a specific number of masters are shown connected to a given switch, the number can vary from embodiment to embodiment. As used herein, a "master" is defined as a component that generates requests, and a "slave" is defined as a component that services requests.

As shown in FIG. 2, switch 210A is coupled to switch 210B, and masters 215A-B are coupled to switch 210B. Switch 210B is also coupled to switch 210C, and switch 210C is coupled to switches 210D and 210E. Masters 220A-C are coupled to switch 210D, and masters 225A-B and slave 225C are coupled to switch 210E. Any number of other switches, components, fabric components, and the like can be coupled in between switch 210C and switch 210N. Alternatively, switch 210C can be coupled directly to switch 210N. Slave 230A and master 230B are coupled to switch 210N, and slave 230A is also coupled to memory controller 240. Memory controller 240 is representative of any number of memory controllers which are coupled to any number of memory devices.

In one embodiment, priority forwarding is a scheme to elevate the priority of requests which have already been issued by a client. A client can elevate priority of its outstanding requests when the client's bandwidth requirements have not been met and, as a result, the client is behind (or is becoming increasingly behind) on its processing. The client processing can have real-time features where a deadline is attached to the processing, or there can be other quality of service requirements that determine when the client is behind on its processing. Alternatively, the client can reduce the priority of its outstanding requests when the processing by the client is ahead of expectations. In one embodiment, priority adjustment is signaled through an in-band request with a special command encoding. In various embodiments, the in-band request does not consume any flow control packets and can be issued by the client or master without regard to flow control mechanisms such as available credits, tokens or otherwise. When priority adjustment is signaled from the client, each switch 210A-N will adjust the priority of pending requests in its queue(s) for that client and also forward the in-band request on every path to memory controller 240.

Figure 3:
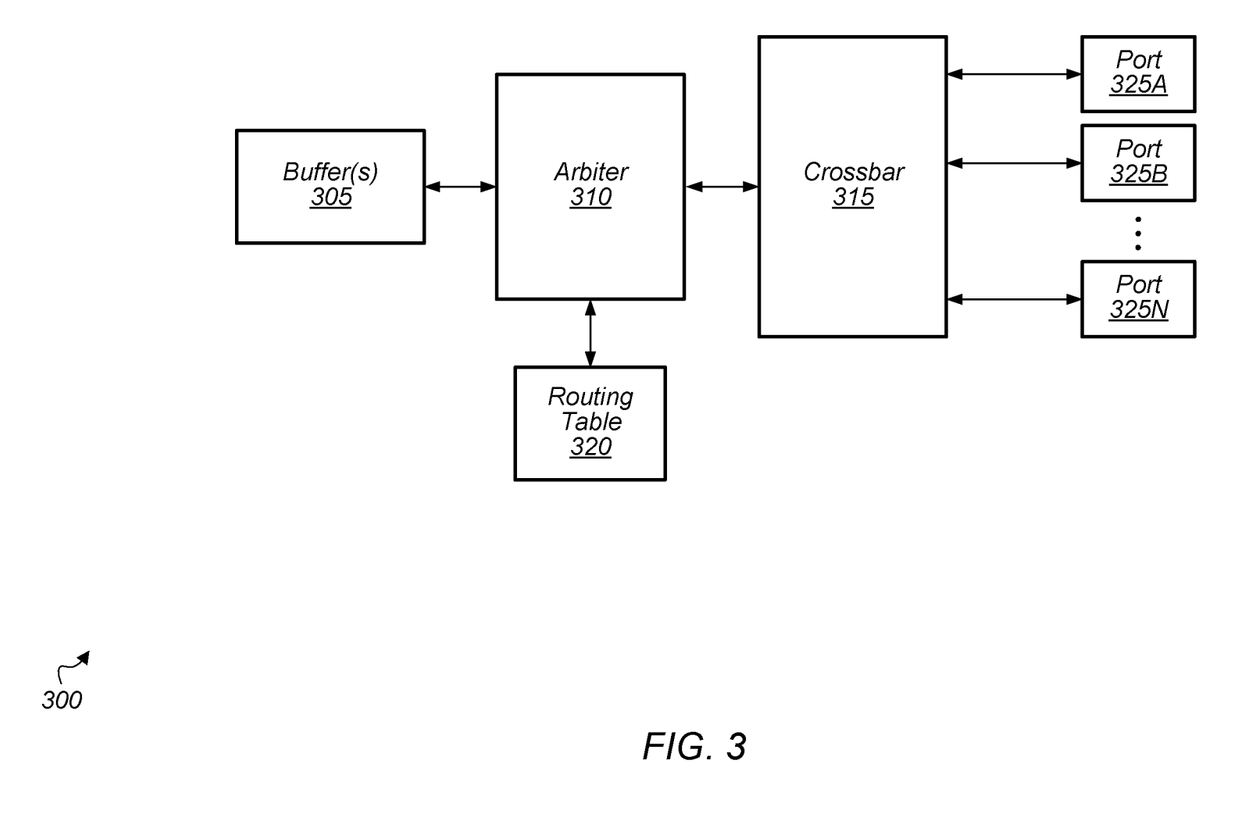
FIG. 3 is a block diagram of one embodiment of an arbitration point.

Referring now to FIG. 3, a block diagram of one embodiment of an arbitration point 300 is shown. In one embodiment, the components of arbitration point 300 are implemented in each of switches 210A-N of FIG. 2. In one embodiment, arbitration point 300 includes buffer(s) 305, arbiter 310, crossbar 315, routing table 320, and ports 325A-N. In other embodiments, arbitration point 300 can include other and/or different components and be organized in other suitable manners. Buffer(s) 305 are representative of any number and type of buffers, queues, or other storage elements for buffering received requests. Arbiter 310 is coupled to buffer(s) 305, routing table 320, and to ports 325A-N via crossbar 315. Ports 325A-N are representative of any number of input, output, or bidirectional ports.

In one embodiment, each source or destination in the fabric (e.g., fabric 115 of FIG. 1) is assigned a fabric ID. When a request is received by arbitration point 300 on one of ports 325A-N, arbiter 310 looks up routing table 320 to determine the output port based on a destination fabric ID of the request. Arbiter 310 is configured to determine which request(s) from buffer(s) 305 to forward on ports 325A-N during a given cycle. In one embodiment, arbiter 310 determines which request(s) to forward based at least on the priorities of the requests stored in buffer(s) 305. Arbiter 310 can also determine which request(s) to forward based on an age of the requests and/or other factors associated with the requests. When priority adjustment is signaled from a client, arbitration point 300 will adjust the priority of pending requests in buffer(s) 305 for the identified client and/or VC and also forward the priority adjustment signal on every path to memory.

Figure 4:
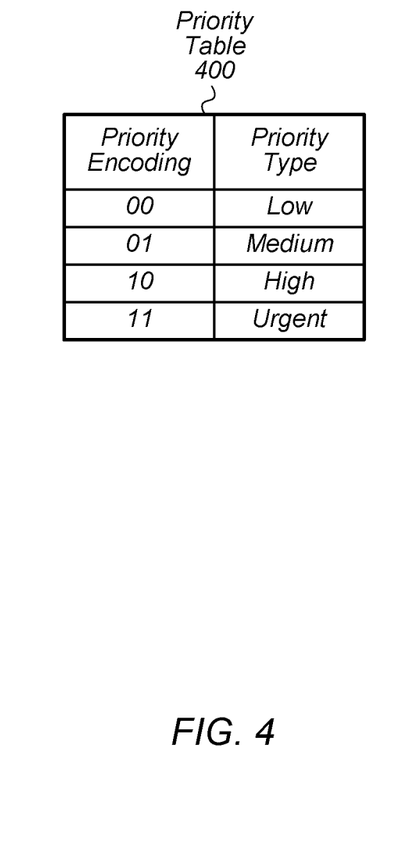
FIG. 4 illustrates a priority table listing priority encodings for a communication fabric in accordance with one embodiment.

Turning now to FIG. 4, one embodiment of a priority table 400 listing priority encodings for a communication fabric is shown. In one embodiment, each request sent on the communication fabric (e.g., fabric 115 of FIG. 1) of a system (e.g., system 100 of FIG. 1) includes a priority encoding field. It is noted that a request can also be referred to as a transaction or a packet. The priority encoding field specifies how the request should be prioritized. The priority encoding field can include any number of bits, with the number of bits varying from embodiment to embodiment.

In one embodiment, the priority encoding field of priority table 400 includes two bits. It should be understood that this is merely indicative of one possible embodiment. As shown in priority table 400, if a request has an encoding of "00", then the request should be treated as having a low priority. If a request has a priority encoding of "01", then the request has a medium priority. If a request has a priority encoding of "10", then the request has a high priority. Lastly, if a request has a priority encoding of "11", then the request has an urgent priority. For each arbitration point in the fabric and other components such as slaves or memory controllers which process requests, these components will attempt to service urgent priority requests first, followed by high priority requests, followed by medium priority requests, and then low priority requests last. It is noted that other factors, such as the age of the request, can also factor into the decision that is made for deciding which request is the next request to forward.

Figure 5:
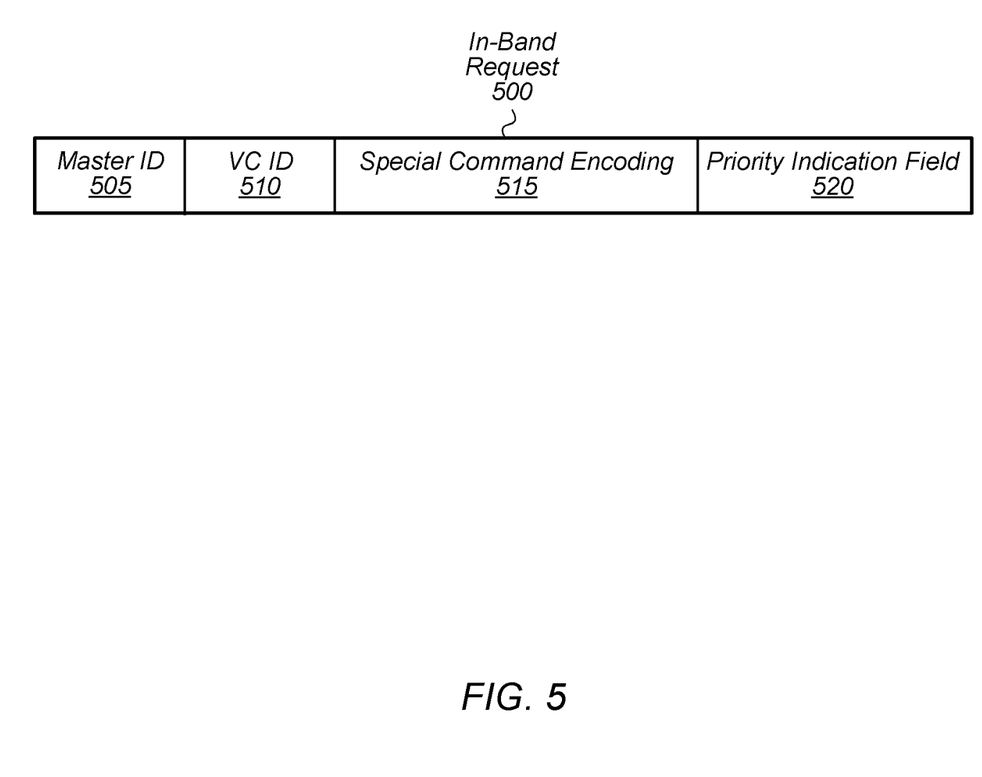
FIG. 5 is a diagram of one embodiment of an in-band request for adjusting priority.

Referring now to FIG. 5, a diagram of one embodiment of an in-band request 500 for adjusting priority is shown. In one embodiment, in-band request 500 includes a master ID field 505, virtual channel (VC) ID field 510, special command encoding field 515, and a priority indication field 520.

In other embodiments, in-band request 500 can include one or more other fields and/or be organized in other suitable manners. For example, in another embodiment, in-band request 500 can include a client ID field in place of master ID field 505.

When an arbitration point receives in-band request 500, the arbitration point adjusts the priority of any outstanding transactions buffered at the arbitration point which meet the criteria specified in the fields of in-band request 500. The special command encoding 515 specifies that in-band request 500 is a priority adjustment request, and causes the arbitration point to adjust the priority of any outstanding transactions buffered at the arbitration point which meet the criteria specified in the fields of in-band request 500. Once the arbitration point has adjusted the priority of the specified transactions, the arbitration point forwards in-band request 500 upstream to the next arbitration point or other component on the path to the memory controller. The next arbitration point will implement the same processing and then forward in-band request 500 to the next upstream component. This process will continue until all arbitration points and other components on the path to the memory controller have been traversed.

The master ID field 505 indicates the master whose outstanding transactions should have their priority adjusted. Alternatively, field 505 can identify a client whose outstanding transactions should have their priority adjusted. The virtual channel (VC) ID field 510 indicates which outstanding transactions to adjust based on the VC of the transactions. Depending on the embodiment, only a master ID 505 can be specified, only a VC ID 510 can be specified, or both a master ID 505 and VC ID 510 can be specified within in-band request 500. Priority indication field 520 indicates the priority which should be assigned to any outstanding transactions that meet the criteria specified in the other fields of in-band request 500.

Figure 6:
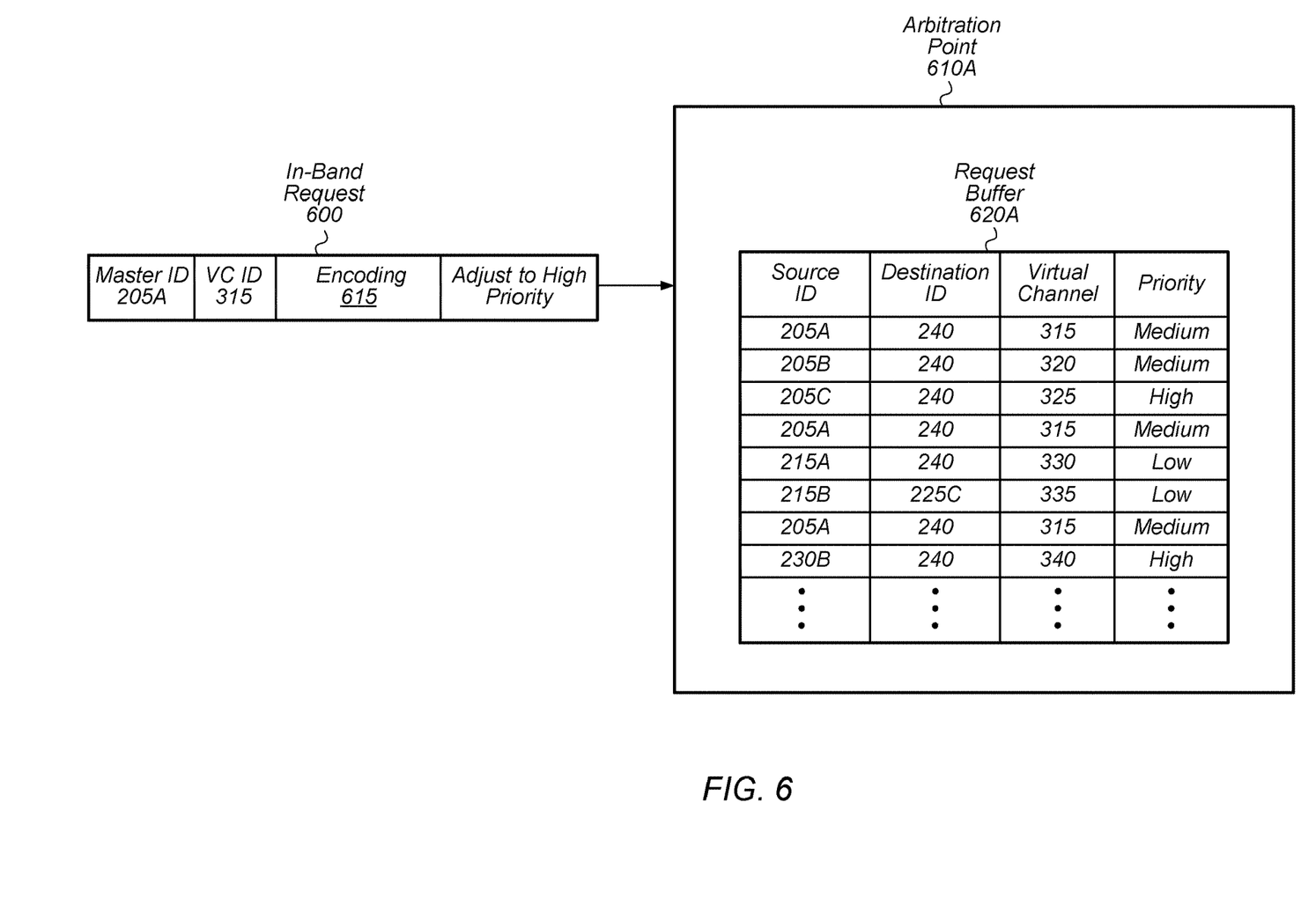
FIG. 6 is a block diagram of one embodiment of an arbitration point receiving an in-band request for adjusting priority.

Turning now to FIG. 6, a block diagram of one embodiment of an arbitration point 610A receiving an in-band request 600 for adjusting priority is shown. Arbitration point 610A is representative of any type of arbitration point within a communication fabric (e.g., fabric 115 of FIG. 1). Arbitration point 610A includes request buffer 620A for buffering received requests, and arbitration point 610A also includes other components which are not shown to avoid obscuring the figure. Buffer 620A includes entries for the outstanding requests which have been received by arbitration point 610A but have not yet been sent out from arbitration point 610A. The source IDs and destination IDs are meant to refer to the components (e.g., masters, slaves) shown in system 200 (of FIG. 2).

It is assumed for the purposes of this discussion that master 205A, or a client serviced by master 205A, has determined that it wants to change the priority of its outstanding requests. For example, in one embodiment, when a client has determined that its bandwidth requirements are not being met, in one embodiment, the client communicates this to master 205A through an in-band request. In other embodiments, the client can communicate to the fabric using an out-of-band method or other technique to indicate a priority adjustment is desired. Accordingly, master 205A generates in-band request 600 to adjust the priority of its outstanding requests and conveys in-band request 600 to arbitration point 610A. In one embodiment, in-band request 600 is organized according to the fields shown in in-band request 500 (of FIG. 5). These fields identify master ID 205A, identify virtual channel (VC) ID 315, include special command encoding 615, and include an indication that outstanding requests should have their priority adjusted to high.

Figure 7:
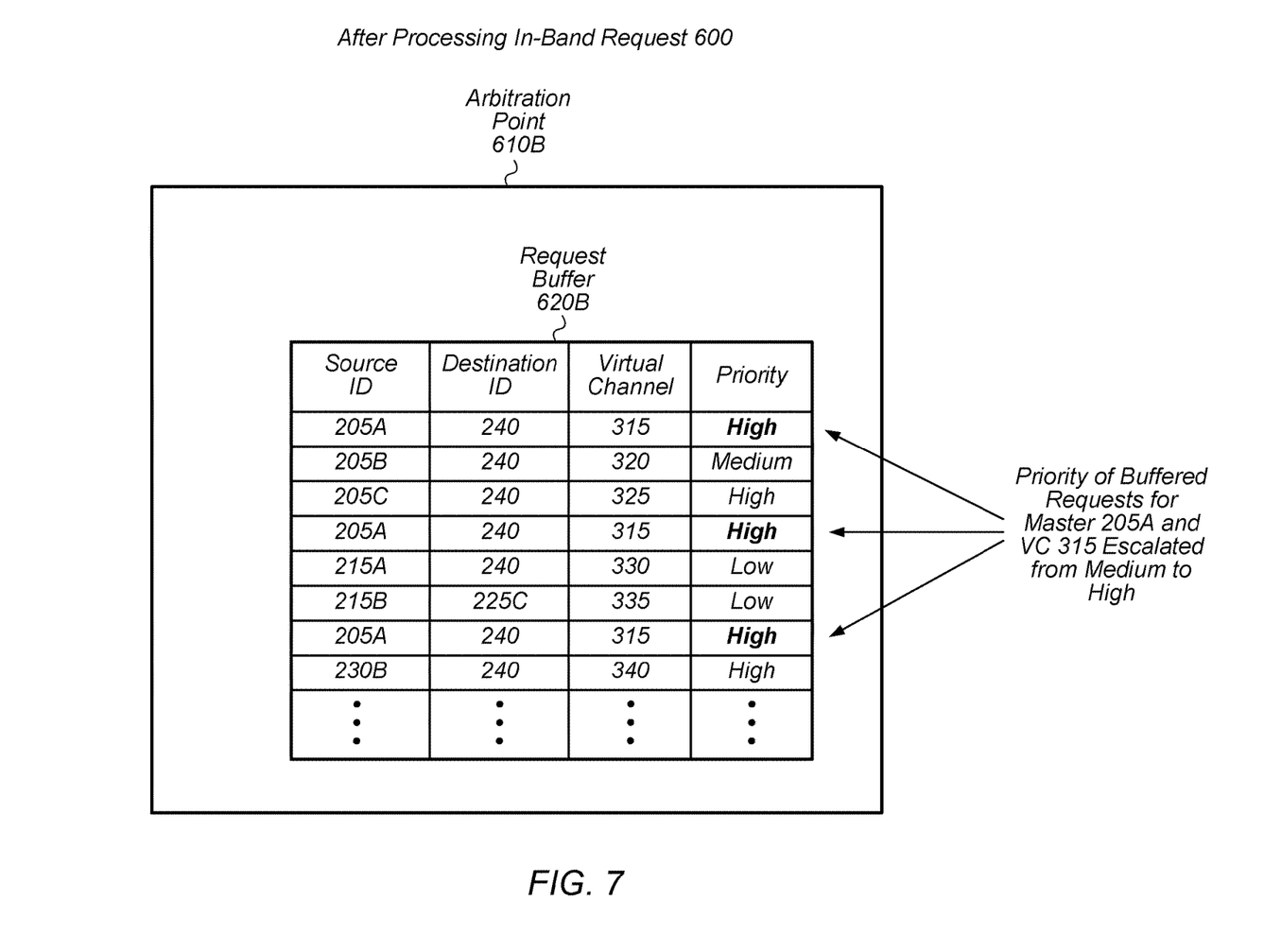
FIG. 7 is a block diagram of one embodiment of an arbitration point after processing an in-band request.

Referring now to FIG. 7, a block diagram of one embodiment of an arbitration point 610B after processing in-band request 600 is shown. Arbitration point 610B and request buffer 620B are intended to represent arbitration point 610A and request buffer 620A at a later point in time after in-band request 600 (of FIG. 6) has been received and processed. When arbitration point 610B receives in-band request 600, arbitration point 610B identifies any outstanding requests buffered in request buffer 620B which are identified by in-band request 600. For example, the master ID and VC ID specified in in-band request 600 are used to identify entries in request buffer 620B. Then, the requests identified in these entries have their priority changed to reflect the new priority specified in in-band request 600. Accordingly, the requests generated by master 205A on virtual channel 315 have their priority changed from medium to high as shown in request buffer 620B. Accordingly, when these requests are forwarded upstream from arbitration point 610B, their priorities will be specified as high to reflect the adjusted priority specified by in-band request 600. In one embodiment, this can result in an increase in the speed at which the requests make progress toward their destination (i.e., the memory controller). Accordingly, when master 205A sends subsequent requests at a high priority, these high priority requests will not pass the previous, outstanding requests since all of the previous requests will have had their priority adjusted to a high priority. This prevents requests with the same source ID and VC from being processed out of order.

Figure 8:
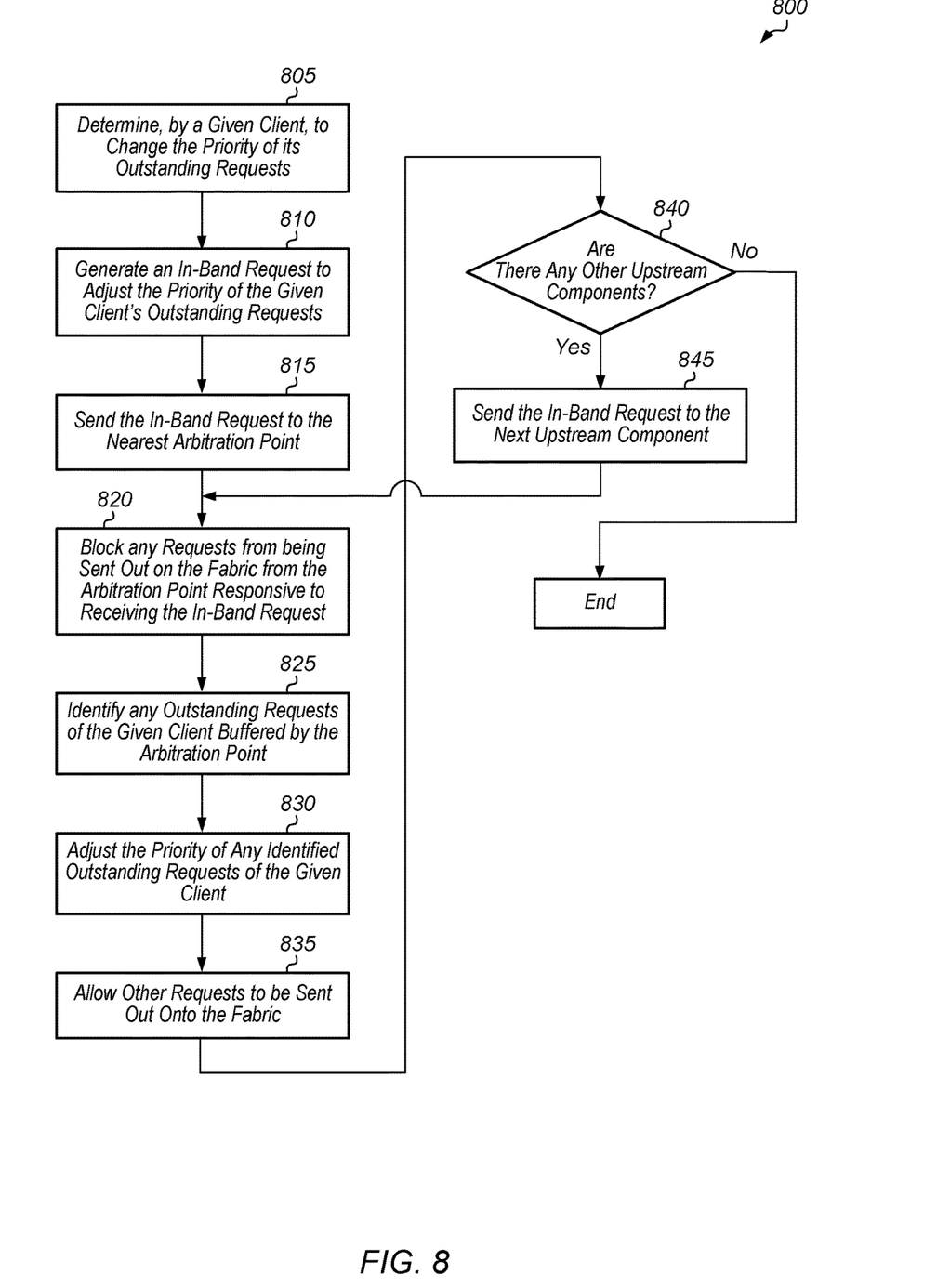
FIG. 8 is a generalized flow diagram illustrating one embodiment of a method for implementing priority adjustment forwarding.

Turning now to FIG. 8, one embodiment of a method 800 for implementing priority adjustment forwarding is shown. For purposes of discussion, the steps in this embodiment are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 800.

A given client within a computing system determines that its bandwidth requirements are not being met (block 805). For example, the given client can determine that it is not receiving data in a timely fashion. The given client can be a processing unit or other type of component within the computing system. In one embodiment, the computing system includes one or more processing units, one or more memory devices, and a communication fabric. The communication fabric is coupled to the one or more processing units and one or more memory devices, and the communication fabric includes a plurality of arbitration points.

In response to a given client determining that it wants to change the priority of its outstanding requests, the given client generates an in-band request to adjust the priority of the its outstanding requests (block 810). The in-band request identifies an in-flight stream of requests generated by the given client for priority adjustment. In some embodiments, the in-flight stream of requests can be identified by a virtual channel. Next, the client and/or master sends the in-band request to the nearest arbitration point (block 815). It is noted that the client can communicate to the master in-band or out-of-band and then the master sends the in-band request to the nearest arbitration point. In response to receiving the in-band request, other pending requests within the arbitration point are temporarily blocked from being sent out from the arbitration point while the in-band request is being processed (block 820). In other words, when the in-band request is received and identified as an adjustment request, processing of other pending requests within the arbitration point is temporarily frozen while updates to the priorities of the pending requests (as needed) are performed. The arbitration point identifies any outstanding requests of the given client that are buffered by the arbitration point (block 825). In another embodiment, the arbitration identifies any outstanding requests of a specified virtual channel. Next, the arbitration point adjusts the priority of any identified outstanding requests of the given client (block 830). In another embodiment, the arbitration point adjusts the priority of any identified outstanding requests of the specified virtual channel. After the priorities of all identified outstanding requests of the given client buffered at the arbitration point have been adjusted, the arbitration point starts allowing other requests to be sent out onto the fabric (block 835).

Then, the arbitration point determines if there are any other upstream arbitration points or other components like slaves or memory controllers that use priority in their processing of requests (conditional block 840). If there are any other upstream components that use priority in their processing of requests (conditional block 840, "yes" leg), then the in-band request is sent to the next upstream component (block 845). After block 845, method 800 returns to block 820. If there are no other upstream components that use priority in their processing of requests (conditional block 840, "no" leg), then method 800 ends.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   one or more processing units comprising circuitry;
   a memory; and
   a communication fabric coupled to the one or more processing units and the memory, wherein the communication fabric comprises a plurality of arbitration points;
   wherein each arbitration point of the plurality of arbitration points in the communication fabric comprises circuitry configured to:

store pending requests of the one or more processing units;

receive an in-band request to adjust a priority of outstanding requests of a given processing unit;

block any stored pending requests of the given processing unit from being forwarded via the fabric, responsive to receiving the in-band request; and adjust a priority of any identified outstanding requests of the given processing unit that are stored in the arbitration point, prior to forwarding any pending requests out of the arbitration point.

2. The system as recited in claim 1, wherein each arbitration point is further configured to forward the in-band request to another upstream component subsequent to adjusting priority for any identified outstanding requests of the given processing unit.

3. The system as recited in claim 2, wherein each arbitration point is further configured to forward the in-band request on each path to the memory.

4. The system as recited in claim 1, wherein each arbitration point is further configured to permit forwarding of outstanding requests to an upstream arbitration point subsequent to adjusting priority for any identified outstanding requests of the given processing unit.

5. The system as recited in claim 1, wherein the in-band request also specifies a given virtual channel (VC), and wherein each arbitration point is further configured to:
   identify any outstanding requests of the given VC that are stored in the arbitration point; and
   adjust priority for any identified outstanding requests of the given VC.

6. The system as recited in claim 1, wherein subsequent to adjusting the priority of the identified outstanding requests of the given processing unit, the arbitration point is configured to forward the in-band request to another component of the communication fabric prior to processing other pending requests.

7. The system as recited in claim 1, wherein the communication fabric is further configured to maintain ordering requirements for all outstanding requests generated by the given processing unit.

8. The system as recited in claim 1, wherein the given processing unit is configured to generate the request to adjust the priority of outstanding requests of the given processing unit in response to determining bandwidth requirements of the given processing unit are not being met.

9. A method comprising:
   storing, in an arbitration point of a plurality of arbitration points of a communication fabric, pending requests of one or more processing units;
   receiving at an arbitration point of the communication fabric an in-band request to adjust a priority of outstanding requests of a given processing unit;
   blocking any stored pending requests of the given processing unit from being forwarded via the fabric, responsive to receiving the in-band request; and
   responsive to receiving the in-band request, adjusting a priority of any identified outstanding requests of the given processing unit that are stored in the arbitration point, prior to forwarding any pending requests out of the arbitration point.

10. The method as recited in claim 9, further comprising forwarding the in-band request to another upstream component subsequent to adjusting priority for any identified outstanding requests of the given client.

11. The method as recited in claim 10, further comprising forwarding the in-band request on each path to a memory.

12. The method as recited in claim 9, further comprising permitting forwarding of outstanding requests to an upstream arbitration point subsequent to adjusting priority for any identified outstanding requests of the given client.

13. The method as recited in claim 9, wherein the in-band request also specifies a given virtual channel (VC), the method further comprising:
   identifying any outstanding requests of the given VC that are stored in one or more buffers of the arbitration point; and
   adjusting priority for any identified outstanding requests of the given VC.

14. The method as recited in claim 9, wherein subsequent to adjusting the priority of the identified outstanding requests of the given processing unit, the method further comprising forwarding the in-band request to another component of the communication fabric prior to processing other pending requests.

15. The method as recited in claim 9, further comprising maintaining ordering requirements for all outstanding requests generated by the given client.

16. The method as recited in claim 9, further comprising the given processing unit generating the request to adjust the priority of outstanding requests of the given processing unit in response to determining bandwidth requirements of the given processing unit are not being met.

17. A communication fabric comprising:
   a plurality of arbitration points, each comprising circuitry;
   a first arbitration point of the plurality of arbitration points; and
   a second arbitration point of the plurality of arbitration points coupled to the first arbitration point;
   wherein the first arbitration point is configured to:
      store pending requests of one or more processing units, each comprising circuitry;
      receive an in-band request to adjust a priority of outstanding requests of a given processing unit;
      block any stored pending requests of the given processing unit from being forwarded via the fabric, responsive to receiving the in-band request; and
      adjust a priority of any identified outstanding requests of the given processing unit that are stored in the first arbitration point, prior to forwarding any pending requests out of the first arbitration point.

18. The communication fabric as recited in claim 17, wherein the first arbitration point is further configured to forward the in-band request to the second arbitration point subsequent to adjusting priority for any identified outstanding requests of the given client.

19. The communication fabric as recited in claim 17, wherein the first arbitration point is further configured to permit forwarding of outstanding requests to the second arbitration point subsequent to adjusting priority for any identified outstanding requests of the given client.

20. The communication fabric as recited in claim 17, wherein the in-band request also specifies a given virtual channel (VC), and wherein the first arbitration point is further configured to:
   identify any outstanding requests of the given VC that are stored in one or more buffers of the first arbitration point; and
   adjust priority for any identified outstanding requests of the given VC.

21. The communication fabric as recited in claim 17, wherein subsequent to adjusting the priority of the identified outstanding requests of the given processing unit, the first arbitration point is configured to forward the in-band request to the second arbitration point of the communication fabric prior to processing other pending requests.

22. The communication fabric as recited in claim 17, wherein the apparatus is configured to maintain ordering requirements for all outstanding requests generated by the given client.

23. The communication fabric as recited in claim 17, wherein the request to adjust the priority of outstanding requests of the given processing unit is generated in response to a determination that bandwidth requirements of the given processing unit are not being met.

* * * * *